W. L. BEALL.
CULTIVATOR.
APPLICATION FILED SEPT. 17, 1914.
1,154,084.
Patented Sept. 21, 1915.
3 SHEETS—SHEET 3.
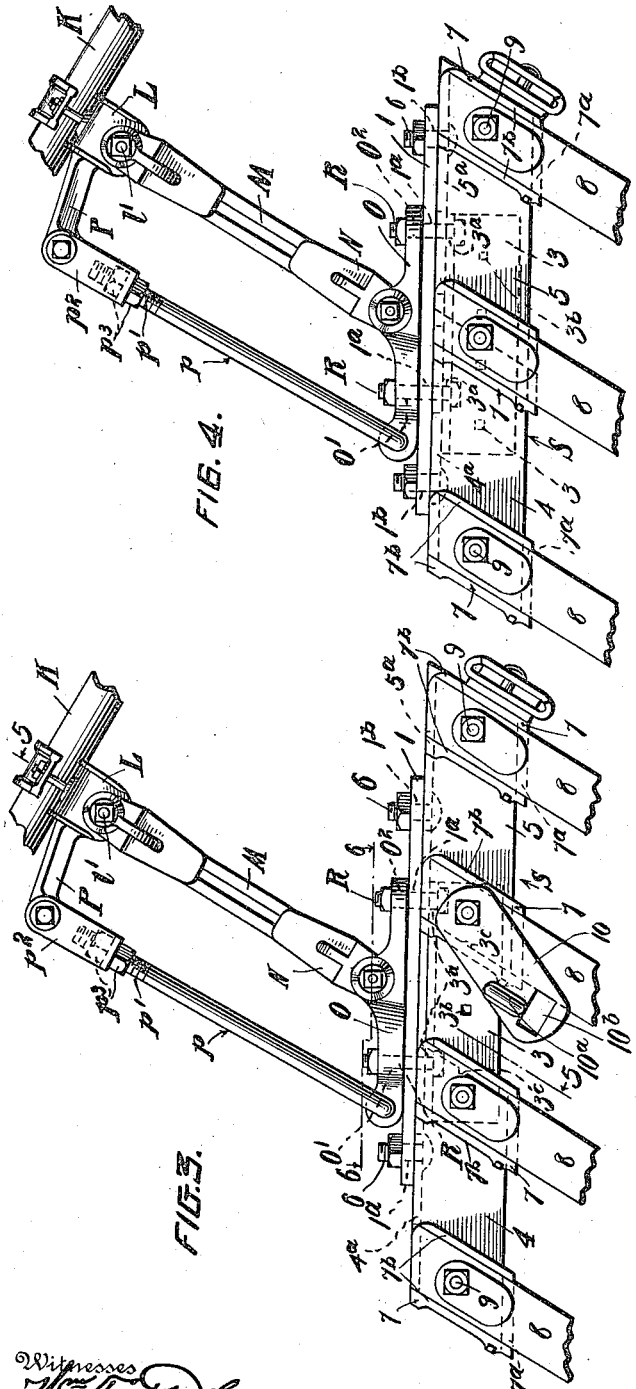
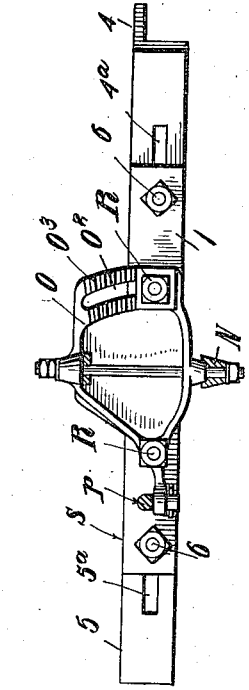
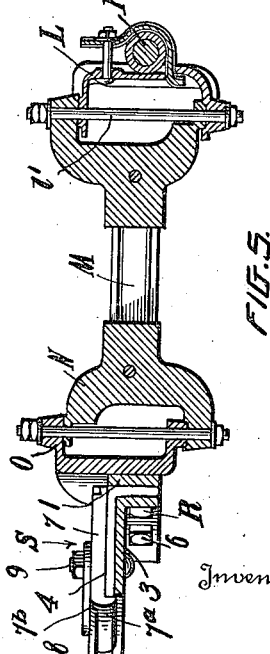

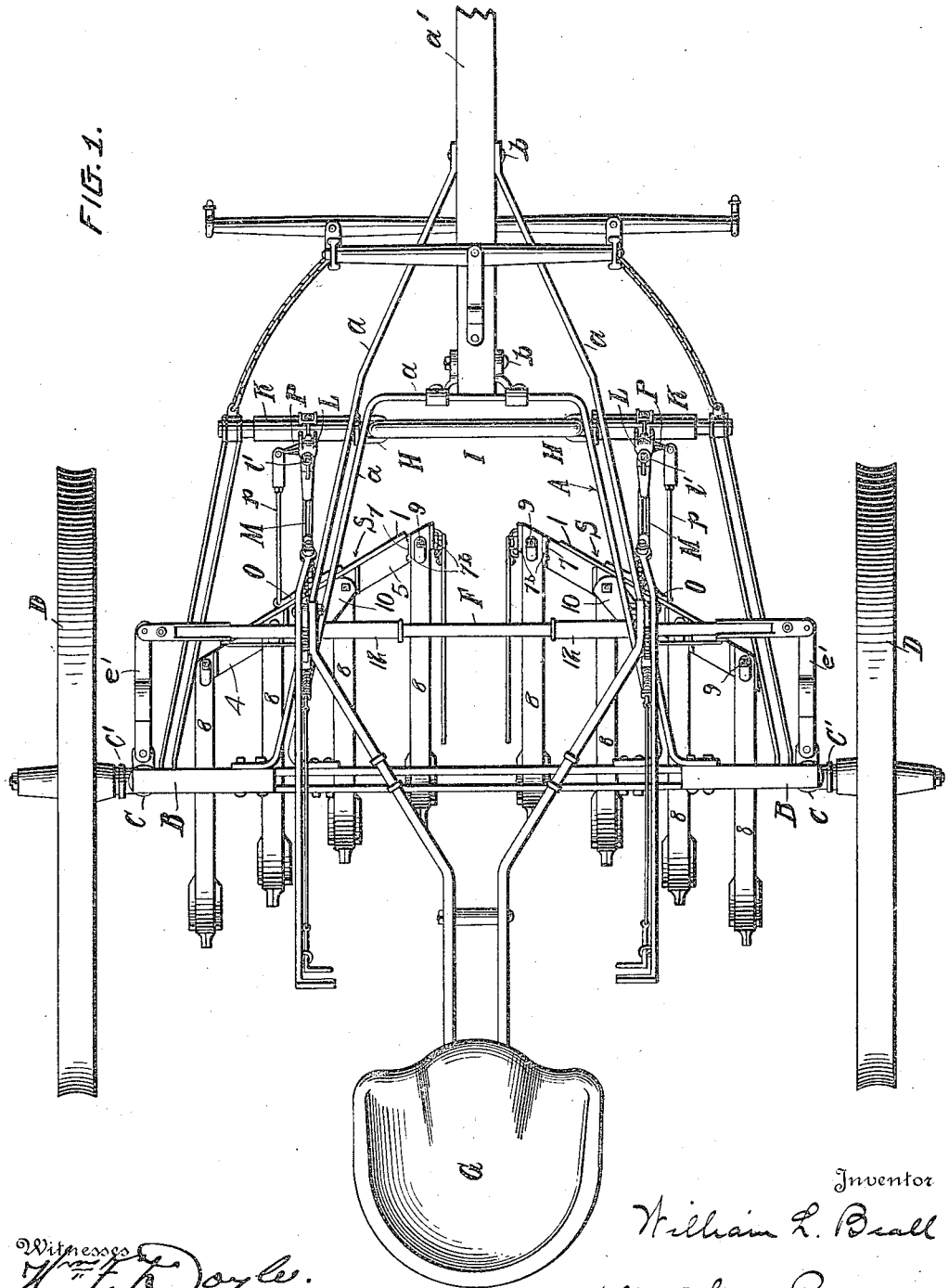

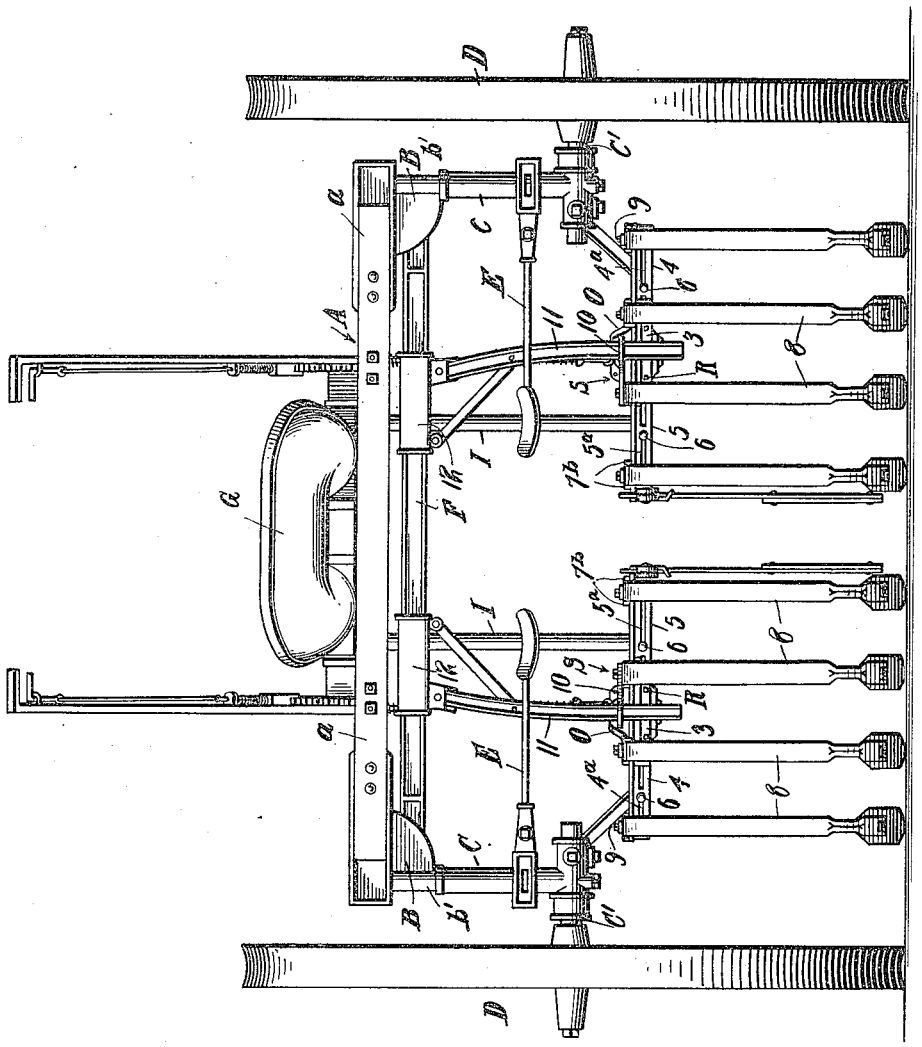

UNITED STATES PATENT OFFICE.

WILLIAM L. BEALL, OF ALBION, MICHIGAN, ASSIGNOR TO GALE MANUFACTURING COMPANY, OF ALBION, MICHIGAN.

CULTIVATOR.

1,154,084.  Specification of Letters Patent.  Patented Sept. 21, 1915.

Application filed September 17, 1914. Serial No. 862,212.

*To all whom it may concern:*

Be it known that I, WILLIAM L. BEALL, citizen of the United States, residing at Albion, in the county of Calhoun and State of Michigan, have invented certain new and useful Improvements in Cultivators; and I do hereby declare the following to be a full, clear, and exact description of the invention, such as will enable others skilled in the art to which it appertains to make and use the same.

My invention relates to improvements in straddle row cultivators and more particularly to harrow attachments adapted to be used in connection therewith.

The object of my invention is to provide a harrow attachment for cultivators which may take the place of the ordinary gangs and be substituted therefor when desired.

A further object is to provide a harrow attachment which may be extended laterally to accommodate different numbers of spring teeth, and which may be adjusted vertically and horizontally to change the angle of the teeth relative to the line of draft and also the position of the teeth relative to the surface of the ground over which the machine is traveling.

With these and other objects in view, my invention consists in the novel features hereinafter described, pointed out in the claims and shown in the accompanying drawings, in which—

Figure 1 is a top plan view of a cultivator equipped with my improved harrow attachment. Fig. 2 is a rear view of the same. Fig. 3 is a top plan view of a detail showing my improved harrow attachment extended to accommodate four spring teeth. Fig. 4 is a similar view showing the device contracted for use with three teeth. Fig. 5 is a section on line 5—5 of Fig. 3. Fig. 6 is a section on line 6—6 of Fig. 3.

My invention is shown as applied to the frame of a pivot axle cultivator such as shown in the U. S. Patent to William L. Beall, No. 654,125, dated July 24, 1900.

The harrow attachment, which is made the subject matter of the present application is substituted when desired for the gangs of the cultivator shown in said patent.

The cultivator shown in said patent comprises a main frame A, which consists of a series of bars $a$ bolted or otherwise secured together and connected to the tongue $a'$ by bolts $b$. The rear ends of the bars of the frame are rigidly secured to the brackets B, having downwardly extending vertical shanks $b'$ upon which are swiveled the socket castings C which carry the axles $c'$ for the wheels D and foot levers E for guiding the machine. Each of the sockets C has a rigidly connected forwardly extending arm $e'$ which arms are connected for joint movement by a bar F. The construction just described permits the guiding of the machine by pressing on the foot levers E. An operator's seat G is also provided upon said frame.

The forward portion of the frame A has rigidly connected thereto by U-bolts H, an arch, I, upon the lower horizontal ends of which are loosely mounted sleeves K and brackets L are rigidly secured to said sleeves. To the brackets are pivotally connected by bolts $l'$ my improved short beams M. It will be noted that the pivotal connections between the beams and the arch allow the beams to be swung in either a vertical or horizontal direction.

The rear ends of the beams M terminate in brackets N to which are swiveled the plow carrying plates O. Arms P extend laterally from the brackets L and are pivotally connected to links $p$, the other ends of the links being pivotally connected to the carrying plates O. These links are provided with means for adjusting their length for the purpose of changing the position of the plows, hereinafter described, relative to the line of draft and said adjusting means consist in forming the links in two parts, a screw threaded portion $p'$ and a yoke $p^2$. The screw portions $p'$ pass through apertures (not shown) in the yokes $p^2$ and are secured by means of nuts $p^3$ which are also used to change the length of the links.

Each of the carrying plates O is provided with an aperture O' and a curved slot $O^2$, the edges of the slot being corrugated as shown at $O^3$. Bolts R provided with nuts pass through plow frames S, hereinafter described, and through the apertures O' and slot $O^2$ to secure said plates and said frames together. The plane of the plow frames S may be varied relative to the surface of the ground by loosening the bolts R and swinging the frames on the bolts which pass through the apertures O', the curved slot permitting this to a certain extent. When the frames have been turned to the desired position, the nuts on the bolts R are tightened, clamping the parts securely together and this is additionally insured by the use of corrugated collars under the nuts of the bolts which pass through the slots $O^2$ which engage the corrugations $O^3$.

The plow frames S each comprise a main flat plate 1, a main angle bar 3 and two subsidiary angle bars 4 and 5, which are clamped between the plate 1 and angle bar 3 and extend beyond the ends of said plate and bar. The bolts R pass through apertures $1^a$ in the plate 1, slots $4^a$ and $5^a$ in the bars 4 and 5 and apertures $3^a$ in the bar 3, and secure said plate and bars together and to the carrying plate O. Bolts 6 pass through apertures $1^b$ in the plate 1 and through the slots in said bars 4 and 5 to additionally and adjustably secure said parts together. The bar 3 is provided in its horizontal portion with three equidistantly spaced apertures $3^b$, the end ones of which are adapted to be used when the plow frames are extended as shown in Fig. 3, and the middle one of which is used when the frames are contracted as shown in Fig. 4. Alining plates 7 and spring plow teeth 8 are secured to the bars 4 and 5 by bolts 9 and each of the plates 7 is provided with downwardly depending flanges $7^a$ to engage the edges of the plates 4 and 5, and with upwardly extending ridges $7^b$ to engage the side edges of the plow teeth to prevent the same from moving laterally. The bolts 9 also secure plates 10 to the plow frames and said plates have loops $10^a$ which are connected up with the means (not completely shown) for elevating the plow frames. Oblong apertures $10^b$ are also provided in said plates 10, through which pass downwardly extending arms 11. These downwardly extending arms 11 are secured at their upper ends to sleeves 12, which are provided upon the bar F and they are for the purpose of moving the plows laterally simultaneously with the wheels as they are guided by the operator.

As shown in Figs. 1, 2, 3, 5 and 6 the bars 4 and 5 are extended with the inner ends of their slots $4^a$ and $5^a$ engaging the bolts R and the inner bolts 9 passing through the end apertures $3^b$ of the plate 3, which construction accommodates four spring teeth 8 enabling an operator to cover a comparatively large area of ground, but when it is desired to reduce the scope of the action of the plows to meet a different condition, the plow frames may be contracted to carry but three plow teeth, as shown in Fig. 4.

When it becomes necessary to change the width of the plow frames from its extended to its contracted position, the inner bolts 9 are removed, the nuts on the bolts R and 6 loosened and the bars 4 and 5 forced inwardly. As the bars are brought together the bolts R and 6 travel in the slots $4^a$ and $5^a$ until the outer ends of said slots abut against the bolts 6, when the nuts on said bolts are tightened. One of the bolts 9 is then passed upwardly through the center one of the apertures $3^b$ of the plate 3, and between notches $3^c$ provided on the inner ends of the bars 4 and 5, the two notches when brought together forming an aperture equal in area to the apertures $3^b$. A plate 7 and tooth 8 are then placed on said bolt and a nut applied, thus forming the construction shown in Fig. 4.

The above description sets forth my preferred construction for obtaining the results described in the preamble of my specification, but it is obvious that the details may be modified without departing from the spirit of my invention.

What I claim and desire to secure by Letters Patent is:—

1. The combination with a cultivator frame, of a harrow attachment comprising beams, extensible plow frames provided with teeth, and means for adjusting said plow frames relative to said beams.

2. The combination with a cultivator frame, of a harrow attachment comprising a plurality of beams pivotally connected to said cultivator frame for vertical and horizontal movement, carrying plates pivotally connected to said beams, means for adjusting the angle of the carrying plates relative to the beams, plow frames provided with teeth and means provided between the plow frames and carrying plates for adjusting the angle of the plow frames relative to the surface of the ground.

3. The combination with a cultivator frame, of a harrow attachment comprising beams, extensible plow frames provided with teeth, and means for adjusting said plow frames and teeth relative to the line of draft and also to the surface of the ground over which the device is traveling.

4. The combination with a cultivator frame, of a harrow attachment comprising beams, plow frames provided with teeth and connected with said beams, said plow frames each consisting of a flat plate, a main angle bar, and subsidiary angle bars adjustably secured between said flat plate and main angle bar.

5. The combination with a cultivator frame, of a harrow attachment comprising beams pivotally connected to said cultivator frame, and plow frames provided with teeth secured to said beams, each of said plow frames consisting of a flat plate, a main angle bar and subsidiary angle bars, longitudinally extending slots provided in said subsidiary angle bars, apertures provided in said flat plate and main angle bar, and means passing through said slots and said apertures for securing said plate and bar together.

6. The combination with a cultivator frame, of a harrow attachment comprising beams pivotally connected to said cultivator frame, plow frames secured to said beams, each of said plow frames consisting of a flat plate, a main angle bar, and subsidiary angle bars provided between said plate and said main angle bar, means for adjustably securing said plate and said bars together to allow said subsidiary bars to be extended laterally, apertures provided in said main angle bar, plow teeth provided upon said frame, bolts securing said plow teeth and said frame, the intermediate bolts also passing through the end apertures in the main angle bar when the subsidiary bars are extended, and only one of said bolts passing through the central aperture in the main bar when the subsidiary bars are in retracted position.

7. The combination with a cultivator frame, of a harrow attachment comprising a beam connected at one end to said cultivator frame, a carrying plate pivotally connected to the other end of said beam, a link having one of its ends pivotally connected to said carrying plate and being screw threaded at its other end, a yoke pivotally connected to a fixed part of the cultivator frame with which the screw threaded end of the link engages, nuts adjustably securing said yoke and said links, and a plow frame provided with teeth secured to said carrying plate.

8. The combination with a cultivator frame, of a harrow attachment comprising a beam connected at one end to said cultivator frame, a carrying plate pivotally connected to the other end of said beam, a link having one of its ends pivotally connected to said carrying plate and being screw threaded at its other end, a yoke pivotally connected to a fixed part of the cultivator frame with which the screw threaded end of the link engages, nuts adjustably securing said yoke and said links, and a plow frame provided with teeth secured to said carrying plate, said plow frame consisting of a flat plate, a main angle bar, and subsidiary angle bars adjustably secured between said plate and main angle bar.

9. A harrow attachment for cultivator frames comprising a beam adapted to be connected at one end to the cultivator frame, a plow frame mounted on the other end of said beam, said plow frame comprising a flat plate, a main angle bar, and subsidiary angle bars adjustably secured between said plate and said main angle bar, alining plates mounted on said subsidiary angle bars and provided with downwardly extending flanges engaging one edge of said subsidiary angle bars, said alining plates being also provided with upwardly extending flanges, and a plow tooth mounted on each of said alining plates, the lateral edges of said teeth engaging said upwardly extending flanges.

In testimony whereof I affix my signature, in the presence of two witnesses.

WILLIAM L. BEALL.

Witnesses:
G. W. BORTLES,
C. W. ALBERT.